US00RE35788E

United States Patent [19]

Theurer et al.

[11] E Patent Number: Re. 35,788

[45] Reissued Date of Patent: May 12, 1998

[54] METHOD OF AND ARRANGEMENT FOR REHABILITATING A BALLAST BED OF A TRACK

[75] Inventors: Josef Theurer, Vienna; Manfred Brunninger, Altenberg, both of Austria

[73] Assignee: Franz Plasser Bahnbaumaschinen-Industriegesellschaft m.b.H., Vienna, Austria

[21] Appl. No.: 603,206

[22] Filed: Feb. 20, 1996

Related U.S. Patent Documents

Reissue of:

[64] Patent No.: 5,479,725
Issued: Jan. 2, 1996
Appl. No.: 258,666
Filed: Jun. 13, 1994

[51] Int. Cl.[6] ..... E02F 5/22

[52] U.S. Cl. ..... 37/104; 37/105; 104/7.1; 104/12; 171/16

[58] Field of Search ..... 37/104, 105, 106; 171/16; 104/2, 5, 7.1, 12; 404/91

[56] References Cited

U.S. PATENT DOCUMENTS

| | | | |
|---|---|---|---|
| 3,872,929 | 3/1975 | Teurer et al. | 171/16 |
| 3,976,142 | 8/1976 | Plasser et al. | 171/16 |
| 4,185,875 | 1/1980 | Swisher, Jr. et al. | 404/91 X |
| 4,267,777 | 5/1981 | Theurer et al. | 104/7.1 |
| 4,355,687 | 10/1982 | Theurer et al. | 171/16 |
| 4,357,874 | 11/1982 | Theurer | 171/16 X |
| 4,479,439 | 10/1984 | Theurer et al. | 37/104 X |
| 4,502,389 | 3/1985 | Theurer et al. | 104/2 |
| 4,676,688 | 6/1987 | Caradot | 404/91 |
| 4,854,243 | 8/1989 | Theurer | 171/16 X |
| 4,944,631 | 7/1990 | Egli | 404/91 |
| 5,026,205 | 6/1991 | Gorski et al. | 404/91 X |
| 5,094,018 | 3/1992 | Theurer et al. | 104/2 X |
| 5,257,580 | 11/1993 | Theurer et al. | 171/16 X |
| 5,394,944 | 3/1995 | Theurer et al. | 171/16 |

*Primary Examiner*—Terry Lee Melius
*Assistant Examiner*—Victor Batson
*Attorney, Agent, or Firm*—Henry M. Feiereisen

[57] ABSTRACT

A mobile arrangement for rehabilitating a ballast bed by installing a protective layer between a subgrade and layer of ballast at a construction site of the track includes an excavation unit for continuously removing old ballast from the ballast bed to expose the subgrade and a rock crusher unit which receives at least a portion of withdrawn old ballast for comminution thereof. Comminuted old ballast is then laid over the exposed subgrade for forming at least part of the protective layer.

22 Claims, 2 Drawing Sheets

METHOD OF AND ARRANGEMENT FOR REHABILITATING A BALLAST BED OF A TRACK

Matter enclosed in heavy brackets [ ] appears in the original patent but forms no part of this reissue specification; matter printed in italics indicates the additions made by reissue.

BACKGROUND OF THE INVENTION

The present invention refers to a method of and arrangement for rehabilitating a ballast bed of a track by installing a protective layer between a subgrade and a layer of ballast.

In general, rehabilitation of a ballast bed includes a continuous removal of old ballast to expose the subgrade, discharging a gravel-sand layer over the exposed subgrade and forming a protective layer for the subgrade by compacting the sand layer.

U.S. Pat. No. 4,479,439 discloses a mobile arrangement for improving a track bed by continuously laying a protective sand layer between the subgrade and the ballast of the track bed during continuous travel of a work vehicle in operating direction. A vertically adjustable excavating chain and conveyer belts for receiving and transporting old ballast are arranged between two undercarriages of the work vehicle which are provided for mobility of the work vehicle on the track. Trailing the excavating chain in operating direction is the discharge end of a conveyer belt assembly consisting of several conveyer belts arranged in succession in operating direction for transport of sand which forms the protective layer for the subgrade. A further conveyer belt assembly for introduction of new ballast is provided with its discharge end behind the discharge end for laying the sand. The work vehicle is further provided with a track lifting unit for raising the track essentially centrally between the on-track undercarriages and to allow a continuous removal of dirty or fouled ballast. At the same time, sand is conveyed to the construction site, and the sand is continuously distributed over the width of the track bed and drops through the crib onto the exposed subgrade. After compacting the sand over the subgrade, new ballast is continuously discharged and planed over the protective sand layer.

U.S. Pat. No. 4,357,874 describes a further mobile arrangement for improving a track bed with two independent and self-propelled work vehicles. Both work vehicles are provided with an overhanging machine frame and have on one end a vertically adjustable hoist which is supported on both sides upon an undercarriage. At the construction site, an assembled track section is lifted by the hoist off the track bed and displaced towards a remote end of the machine frame of the first vehicle. Subsequently, fouled ballast is removed by the excavating means which is mounted on the second work vehicle. The first work vehicle is then moved over the trackless renewal section for discharging and compacting sand and new ballast over the trackless renewal section. Thereafter, the detached assembled track section is lowered by the hoist onto the rehabilitated renewal section. The mobile arrangement and method according to U.S. Pat. No. 4,357,874 is suitable for rehabilitating short track sections.

The publication entitled "Verfahren zur Verbesserung des Planums auf vorhandenen Streckcen", UIC-Codex 722E, Internationaler Eisenbahnverband, Jan. 1, 1990, page 11, describes another method of improving the subgrade of a track by initially completely removing the fouled ballast by means of a bed cleaning machine. Removed material is partially laterally deposited or loaded onto suitable freight cars. Next, exposed subgrade is leveled, possibly with a geotextile installed under the track between the ballast and the subgrade, and the track is placed over the subgrade. Thereafter, a gravel-sand layer is discharged from a dump car and distributed to the required level with a ballast planing machine. Subsequently, a tamping and lining machine lifts the track panel off the track and compacts the gravel-sand layer under the ties with enlarged tamping picks. Finally, ballast is discharged from the dump car, the track is lifted, the ballast is tamped and the track is correctly aligned.

German patent specification DE 42 37 712 A 1 describes yet another mobile arrangement for rehabilitating the track bed, including two separate work vehicles, with one work vehicle supporting an excavating means for removing old ballast and the other work vehicle supporting a track lifting unit as well as a planing and compacting unit.

SUMMARY OF THE INVENTION

It is an object of the present invention to provide an improved method and arrangement for rehabilitating a ballast bed of a track in a simple and cost-efficient manner during a continuous travel of a work vehicle.

This object and others which will become apparent hereinafter is attained in accordance with the present invention by comminuting at least a portion of removed old ballast in a rock crusher unit and discharging comminuted old ballast over the exposed subgrade to form at least part of the protective layer for the subgrade.

In this manner, a portion of old ballast can be reclaimed during a continuously progressing subgrade rehabilitation for use as at least one component of the protective layer for the subgrade. Thus, the amount of old ballast being carried off as well as the amount of sand to be transported to the construction site can be reduced to thereby simplify the subgrade rehabilitation through reduced transportation and reduced material consumption while still maintaining the work output.

Advantageously, the comminuted old ballast is mixed for formation of the protective layer for the subgrade at a desired ratio with sand which is transported by suitable transport vehicles to the construction site. The old ballast is suitably cleaned before being comminuted in order to maintain a desired quality of the protective layer.

In situations in which the old ballast bed is of relatively small height, it is even possible to save the expensive transportation of old ballast altogether by completely comminuting the old ballast for formation of the protective layer for the subgrade while cutting the subgrade to the desired height and laying excess soil and possibly old ballast to the shoulders of the subgrade.

Preferably, undersized ballast is screened out before comminuting the old ballast and discharged over the exposed subgrade so as to reduce the strain on the rock crusher unit. Screened out undersized ballast is in particular suitable as base for the protective layer being disposed between the subgrade and the ballast bed.

In accordance with the present invention, a mobile arrangement for subgrade rehabilitation includes a machine frame which is supported by undercarriages for movement in an operating direction along the track and is provided with a rock crusher unit by which at least a portion of removed old ballast is comminuted and subsequently transferred for discharge over the exposed subgrade for formation of at least part of a protective layer between the subgrade and the ballast bed. This mobile arrangement assures in a very simple manner a comminution of old ballast directly on the construction site without inhibiting a continuous operation and without modification of the proven basic concept for carrying out a continuous subgrade rehabilitation. Withdrawn and comminuted old ballast is transported by suitable conveyer means from the rock crusher unit to the renewal section fur discharge over the subgrade.

Preferably, the portion of old ballast which is reclaimed for making the protective layer is withdrawn from the ballast bed by a separate excavation unit to allow a removal of only the upper, less fouled portion of the ballast bed for subsequent comminution. Trailing this excavation unit in operating direction is a main excavation unit by which the remaining ballast bed together with cut subgrade is removed and transported away for dumping onto freight cars. Suitably, the main excavation unit is in communication with a further conveyer belt which terminates in a discharge end situated on one end of the machine frame above the freight car.

Through the arrangement of two excavation units within the bending line of the lifted track, i.e. within the work area, the productivity of the ballast bed excavation can be increased and still usable ballast can be reclaimed for reuse in an economical manner. The provision of a separate leading excavation unit in addition to the main excavation unit enables a removal of only an upper layer of the ballast bed while the lower ballast layer mixed with soil can then be completely removed by the main excavation unit. Since both excavation units are positioned within the lifted track, the height of the upper layer being reclaimed by the leading excavation unit can be rapidly adjusted and modified in dependence on the degree of contamination and on the need of ballast quantity. Further, through the use of the trailing main excavation unit, the exposed subgrade can be easily positioned relatively deep so that the installation of the protective layer for the subgrade is possible without changing the absolute track geometry.

The machine frame may be provided with a first carrier frame which supports the rock crusher unit and a second carrier frame which is linked to the first carrier frame and positioned between two terminal undercarriages for support of the two excavation units. In this manner, the lifting of a track and a removal of old ballast through both excavation units can be carried out at a same time as the comminution of reclaimed old ballast without mutual interference and with a minimum of transport distances.

According to another feature of the present invention, the mobile arrangement includes a hopper which receives comminuted old ballast and in addition sand from an additional conveyer belt so as to be able to make a desired mixture of comminuted ballast and sand. This mixture for formation of the protective layer between the subgrade and the ballast bed is laid over the entire width of the protective layer by a suitable swing-type conveyor belt for subsequent planing and compaction. Sand is supplied from a suitably coupled freight car via a further conveyer belt which extends from the rearward end of the machine frame.

Preferably, excavated ballast is elevated to a vibrating screen which removes dirt from the old ballast which is then conveyed to the rock crusher unit for comminution. The waste simply drops under the screen over the exposed remaining old ballast. A further vibrating screen may be placed between the entrance to the rock crusher unit in order to separate undersized ballast from the old ballast before being comminuted to minimize the strain on the rock crusher unit.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
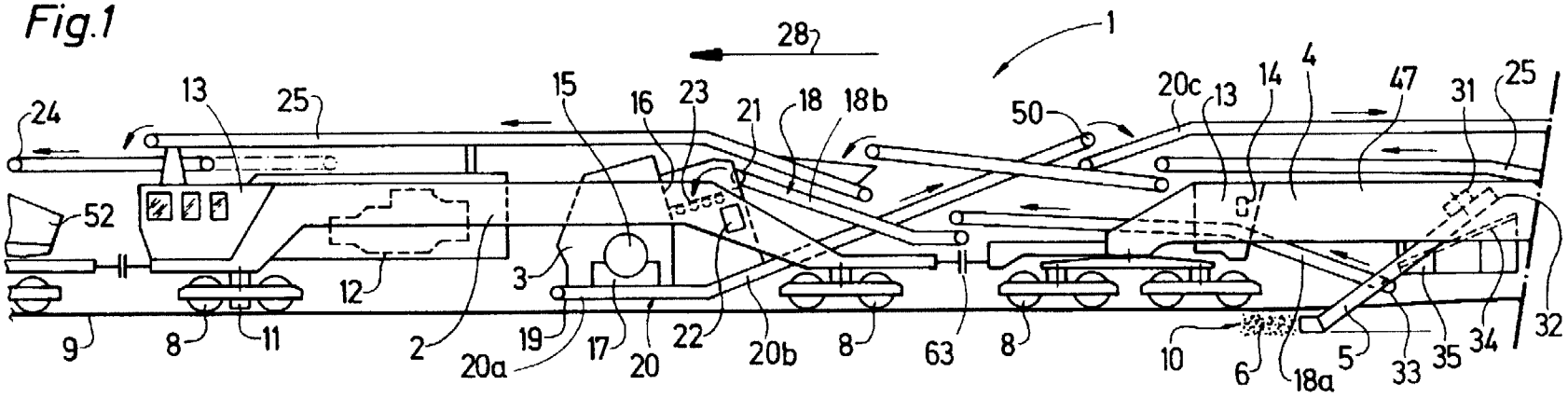
FIG. 1 is a side elevational view of a forward portion of one embodiment of a mobile arrangement machine according to the present invention for subgrade rehabilitation of the ballast bed of a track.

Throughout all the Figures, the same or corresponding elements are always indicated by the same reference numerals.

Figure 2:
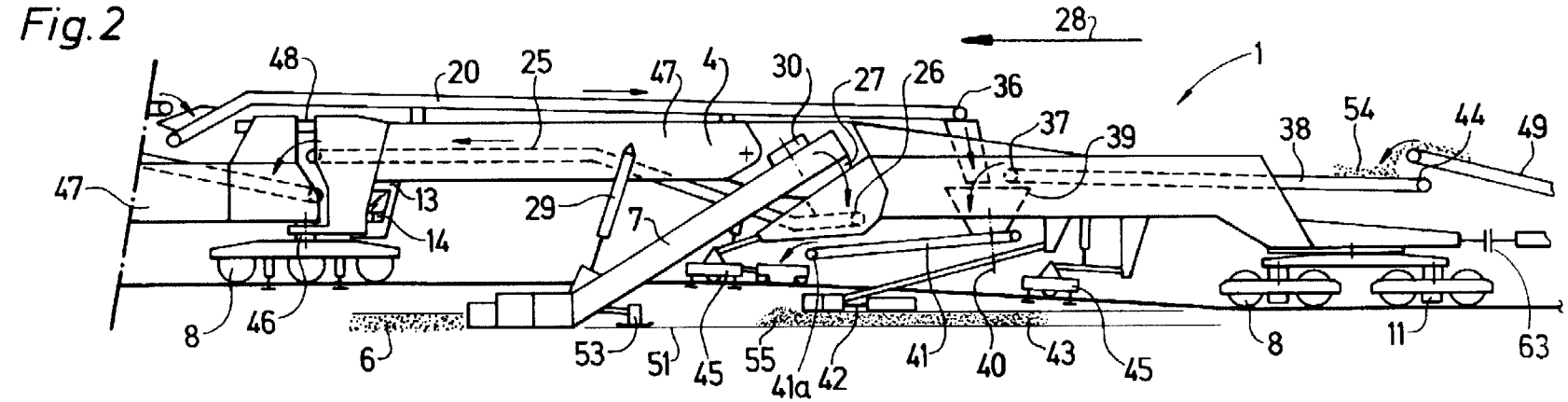
FIG. 2 is a side elevational view of the rearward portion of the mobile arrangement of FIG. 1.

Referring now to the drawing, and in particular to FIGS. 1 and 2, there are shown respective side views of a forward portion and a rearward portion of a mobile arrangement generally designated by reference numeral 1, for subgrade rehabilitation of a ballast bed 10 for support of a track 9. The mobile arrangement 1 includes an elongated machine frame comprised of a forward carrier frame 2 and a rearward carrier frame 4 arranged sequentially in operating direction and linked by a suitable coupling, schematically indicated by reference numeral 63. The carrier frames 2, 4 are supported on the track 9 by several undercarriages 8 for mobility along the track 9 in operating direction as indicated by arrow 28.

The forward carrier frame 2 is provided with a rock crusher unit 3, and the rearward carrier frame 4 supports an excavation unit 5 for excavating old ballast 6 to be comminuted and a main excavation unit 7 which trails the excavation unit 5 in operating direction and excavates the remaining old ballast 6. Secured on the forward end of the carrier frame 2 is an operator's cab 13, and a central power source 12 is located behind the operator's cab 13 for supplying power to all operating drives 11 and working units of the arrangement 1. Further supported on the rearward carrier frame 4 are additional operator's cabs 13, each including a control panel 14 for viewing and operating the excavating units 5,7.

It will be appreciated by persons skilled in the art that the excavating units 5, 7 must contain additional apparatus which does not appear in the drawing. For example, each illustrated excavation unit 5, 7 includes an endless excavating chain which is led around the track 9. The excavating chain extends underneath the track 9 over the width of the ballast bed for immersion in the ballast to reclaim ballast as the endless chain is moved therethrough. Moreover suitable drives must be provided to operate the excavation units and to raise and lower the same into and out of operating position. However, this apparatus, like other necessary apparatus, is not part of the invention, and has been omitted from the Figures for the sake of simplicity.

The rock crusher unit 3 mounted on the forward carrier frame 2 for comminuting the old ballast 6 is operated by a drive 15 and includes an inlet opening 16 and an outlet opening 17. Old ballast 6 is removed by the excavating unit 5 and transferred to the receiving end 33 of a first conveyer belt arrangement 18 for transport or withdrawn old ballast 6 to the inlet opening 16 of the rock crusher unit 3. In the nonlimiting example of FIG. 1, the conveyer belt arrangement 18 is comprised of two conveyer belts extending longitudinally in operating direction, with one conveyer belt 18a extending from the excavating unit 5 to the end of the carrier frame 4 and with the other conveyor belt 18b extending from the trailing end or carrier frame 2 below the conveyer belt 18a to the rock crusher unit 3. Comminuted old ballast exiting the rock crusher unit 3 through outlet opening 17 drops onto the receiving end 19 of the second conveyer belt assembly 20 extending longitudinally in direction of the machine frame 2. The conveyer belt assembly 20 includes a horizontal conveyer belt 20a extending immediately below the outlet opening 17 and connected to an ascending conveyer belt 20b which extends beyond the trailing end of the carrier frame 2 towards the rear of the carrier frame 4 via a conveyor belt 20c.

As further shown in FIG. 1, a screening unit 23 is disposed between the inlet opening 16 of the rock crusher unit 3 and the discharge end 21 of the conveyer belt 18b. The screening unit 23 is provided with a vibrator 22 for separating undersized ballast from old ballast 6 reclaimed from the ballast bed 10 by the excavating unit 5 and transported by the conveyer belt assembly 18. Disposed on the forward or leading end of the carrier frame 2 is the discharge end 24 of a third conveyer belt assembly 25 which extends longitudinally in operating direction. The conveyer belt assembly 25 includes several conveyor belts suitably arranged in succession to transport remaining old ballast not excavated by the excavation unit 5 from a receiving end 26 below the discharge outlet 27 of the main excavation unit 7 to the discharge end 24. Both excavating units 5, 7 are mounted to the trailing carrier frame 4 between two terminal undercarriages 8, with the main excavating unit 7 trailing the excavating unit 5 in operating direction and being provided with a vibrator 30 and a drive unit 29 for vertical and lateral adjustment. Arranged behind the receiving end of the excavation unit 7 is a compacting unit 53 by which the exposed and planed subgrade is compacted. The excavating unit 5 which is also vertically and laterally adjustable and includes a vibrator 31 is acted upon by a screening unit 34 which is equipped with a vibrator 35 and extends between the discharge end 32 and the receiving end 33 of the first conveyer belt assembly 18.

As shown in particular in FIG. 2, the conveyor belt 20c of the second conveyer belt assembly 20 terminates in a discharge end 36 immediately above a hopper 39 for dumping ballast comminuted by the rock crusher unit 3 and transported by the second conveyor belt assembly 20 into the hopper 39. In addition, sand 54 is introduced into the hopper 39 via the discharge end 37 of a fourth conveyor belt 38 which has a receiving end 44 at the rearward end of the carrier frame 4 and receives sand 54 from a conveyer belt 49 of a freight car which is linked to the trailing carrier frame 4 via a coupling 63. The hopper 39 in which comminuted old ballast 6 and sand 54 are blended to form a ballast-sand mixture 55 and is mounted on a swing-type conveyor belt 41 which pivots about a vertical axis 40 and has a discharge end 41a at a location directly before a planing and compacting unit 42 which trails the compacting unit 53 and is provided for planing and compacting the subgrade ballast-sand mixture 55 for formation of a protective layer 43 for the subgrade.

The trailing carrier frame 4 is further provided with two track lifting units 45 which are spaced from each other in operating direction. As shown in FIG. 2, the trailing carrier frame 4 includes two frame parts 47 which are joined together in the area of the central undercarriage 8 by a link 46 and shiftable relative to each other by a spindle drive 48. Thus, the central undercarriage 8 can be raised to disengage from the ballast bed 10 during operation.

At operation, the mobile arrangement 1 travels continuously in direction of arrow 28, with the track 9 being raised by both track lifting units 45 in the area of the training machine frame 4. The endless excavating chain of the excavation unit 5 continuously withdraws the top layer of the old ballast 6 of the ballast bed 10 and drops it via the discharge end 32 onto the vibrating screen 34 for separating waste or dirt from the withdrawn old ballast 6. The waste drops through openings of the screen 34 directly over the remaining ballast bed 10. Reclaimed old ballast 6 is transferred from the vibrating screen 34 to the first conveyer belt assembly 18 for transport to the vibrating screen 23 which is positioned before the inlet opening 16 of the rock crusher unit 3. The screen 23 screens out undersized ballast (small ballast stones) which drop directly onto the second conveyer belt assembly 20 while the remaining old ballast 6 enters the rock crusher unit 3 via the inlet opening 16 for comminution to a desired, selectively adjustable grain size. The comminuted old ballast 6 exits the rock crusher unit 3 via the outlet opening 17 and is received by the second conveyer belt assembly 20 for transport to the hopper 39. At the same time, sand 54 is introduced into the hopper 39 from the conveyer belt 49 of the freight car via the fourth conveyer belt assembly 38. Comminuted old ballast 6 and sand 54 are blended in the hopper 39 at a desired ratio which is adjustable through suitable control of the drives for the conveyer belt assemblies 20, 38. Reference numeral 50 designates one exemplified drive. The mixture of comminuted old ballast 6 and sand 54 is then discharged via the swing-type conveyor belt 41 over the subgrade 51.

The endless excavating chain of the main excavation unit 7 withdraws the remaining old ballast 6 of the ballast bed 10 and, if necessary, excavates also part of the substructure of the track bed to expose the subgrade 51. The remaining old ballast 6 is thrown off the third conveyer belt assembly 25 and is loaded in the area of the discharge end 24 into the freight car 52. The exposed and leveled subgrade 51 is then compacted by the compacting unit 53. Immediately behind the compacting unit 53, the subgrade ballast-sand mixture 55, prepared through blending comminuted old ballast 6 with sand 54, is released from the hopper 39 and discharged over the subgrade. The planing and compacting unit 42 levels and consolidates the ballast-sand mixture 55 to form the protective layer 43 for the subgrade 51. Immediately before the rear undercarriage 8 of the trailing carrier frame 4, the track 9 is laid onto the compacted protective layer 43 for the subgrade 51. After operation of the mobile arrangement 1, new ballast is disposed over the track 9 which is lifted and with ballast falling under the track 9 being tamped under the track ties.

Turning now to FIGS. 3–6, there are shown modifications of the mobile arrangement 1, according to the present invention. For sake of simplicity, same or corresponding elements have been designated by same reference numerals as used in FIGS. 1 and 2.

Figures 3, 4, 5, 6:
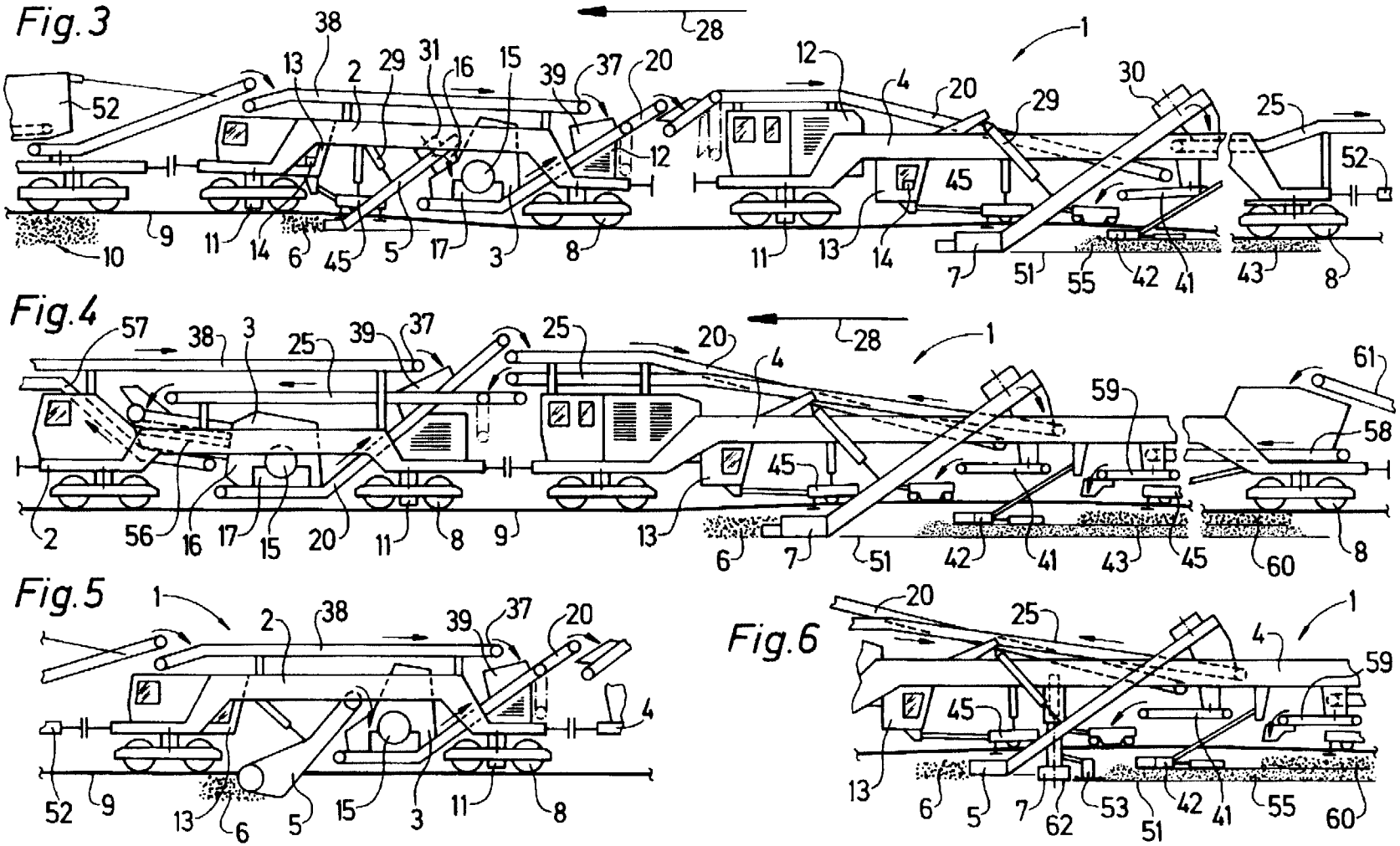
FIGS. 3 to 6 are side elevational views of further embodiments of a mobile arrangement according to the present invention for subgrade rehabilitation of the ballast bed of a track.

In the embodiment of the mobile arrangement 1 according to FIG. 3, the leading excavating unit 5 for reclaiming part of the old ballast 6 is mounted onto the leading carrier frame 2 which also supports the vertically adjustable and laterally adjustable track lifting unit 45. Old ballast 6 partly withdrawn by the first excavating unit 5 is transported to the inlet opening 16 of the rock crusher unit 3 for comminution and transferred to the second conveyer belt assembly 20 for transport of comminuted old ballast 6 is transported through the hopper 39. The hopper 39 is positioned below the discharge end 37 of the fourth conveyer belt assembly 38 for receiving sand 54 supplied from the freight car 52 which is linked to the carrier frame 4. In the hopper 39, sand 54 drops on the advancing comminuted old ballast 6 and is mixed with the old ballast 6 to provide a subgrade ballast-sand mixture 55 which is supplied via the second conveyer belt assembly 20 to the swing-type conveyor belt 41 for discharge over the exposed subgrade 51. Remaining old ballast 6 withdrawn by the main excavating unit 7 is transported by the third conveyer belt assembly 25 to the trailing end of the mobile arrangement 1 for transfer to the coupled freight car 52.

It will be appreciated by persons skilled in the art that instead of being conducted through the hopper 39, the second conveyor belt assembly 20 may certainly also pass slightly underneath the outlet port of the hopper 39 so that outflowing sand can be mixed with the old ballast advanced past the outlet port of the hopper 39 by the conveyor belt assembly 20.

The variation of the mobile arrangement 1 as shown in FIG. 4 includes only the main excavating unit 7 by which the entire old ballast 6 is withdrawn and transported via the third conveyer belt assembly 25 to a screening unit 56 for cleaning the old ballast 6. Cleaned old ballast then enters the rock crusher unit 3 through inlet opening 16, with waste being carried off via a conveyer belt 57. Comminuted old ballast 6 is transported via the second conveyer belt assembly 20 to the swing-type conveyor belt 41 for discharge over the exposed subgrade 51. If desired, sand 54 may be additionally supplied via the fourth conveyer belt assembly 38 and mixed with comminuted old ballast 6 in the hopper 39. New ballast 60 is supplied at the trailing end of the mobile arrangement 1 via a conveyer belt 58 and a swing-type conveyor belt 59 for discharge over the protective layer 43. The new ballast 60 is stored in a freight car 61 which is coupled to the trailing carrier frame 4 of the mobile arrangement 1.

In the embodiment of the mobile arrangement 1 according to FIG. 5, the excavating unit 5 is mounted to the leading carrier frame 2 in form of two separately vertically adjustable shoulder chains which are spaced from each other transversely to the operating direction for withdrawing old ballast 6 from the tie end area along the shoulder. The remaining old ballast 6 laid under the track 9 is then withdrawn and carried off by the trailing main excavating unit 7 (not shown in FIG. 5).

The variation of the mobile arrangement 1 according to FIG. 6 includes a specially designed main excavating unit 7 which trails the excavating unit 5 for withdrawing old ballast. The excavating unit 7 includes two leveling chains 62 which are spaced from each other transversely to the machine frame and pivotable about a vertical axis in a plane underneath the track 9. Such leveling chains 62 which are known per se and also referred to in U.S. Pat. No. 4,355,687 scrape remaining old ballast 6, possibly together with soil, which is laterally deposited in the shoulder area of the substructure to provide the subgrade 51 which is then compacted by the compacting unit 53. The ballast-sand mixture 55 and new ballast 60 are introduced via swing-type conveyor belts 41 and 59 in a manner described in connection with FIG. 4.

As further indicated in FIGS. 3–5 by broken lines, racing end sections of conveyor belt arrangements 20 and 25 are partly foldable to allow a secure transfer of material during transport between the coupled carrier frames 2, 4 and to prevent conveyor sections from extending beyond the end of the machine frame 2 when disengaging the carrier frames 2,4.

The mobile arrangement 1 according to the present invention is particularly suitable for rehabilitation or a very low ballast bed because in this situation the ballast bed can be completely reclaimed through the excavating unit 5, cleaned by the screening unit and supplied to the rock crusher unit. Since the leveling chains 62 only 4 laterally convey the scraped material towards the shoulder area of the substructure, a transport thereof is advantageously eliminated.

While the invention has been illustrated and described as embodied in a method or and arrangement for rehabilitating a ballast bed of a track, it is not intended to be limited to the details shown since various modifications and structural changes may be made without departing in any way from the spirit of the present invention.

What is claimed as new and desired to be protected by letters patent is set forth in the appended claims:

We claim:

1. A method of rehabilitating a ballast bed by installing a protective layer between a subgrade and a layer of ballast, comprising the steps of:

exposing the subgrade by continuously removing old ballast from the ballast bed;

withdrawing and comminuting at least a portion of old ballast;

*mixing sand with comminuted old ballast to form a ballast-sand mixture; and* discharging [comminuted old ballast] *the ballast-sand mixture* over the exposed subgrade to form at least part of the protective layer[; and mixing sand with comminuted old ballast to form a ballast-sand mixture and discharging the mixture upon the exposed subgrade for formation of the protective layer after removal of remaining old ballast].

2. The method of claim 1, further comprising the steps of planing and compacting the protective layer, and discharging new ballast over the protective layer.

3. The method of claim 1, further comprising the step of cleaning the portion of withdrawn old ballast before said comminuting step.

4. The method of claim 1 wherein after withdrawal of the portion of old ballast for comminution remaining old ballast is scraped for disposal at a shoulders of the subgrade.

5. The method of claim 1, further comprising the step of screening out undersized ballast from the portion of withdrawn old ballast before said comminuting step, and discharging the undersized ballast over the exposed subgrade.

6. A method of rehabilitating a ballast bed by installing a protective layer between a subgrade and a layer of ballast comprising the steps of:

exposing the subgrade by continuously removing old ballast from the ballast bed;

withdrawing and comminuting at least a portion or old ballast;

scraping remaining old ballast for disposal at a shoulder of the subgrade; and discharging comminuted old ballast over the exposed subgrade to form at least part of the protective layer.

7. The method of claim 6, further comprising the steps of planing and compacting the protective layer, and discharing new ballast over the protective layer.

8. The method of claim 6, further comprising the step of cleaning the portion of withdrawn old ballast before said comminuting step.

9. The method of claim 6, further comprising the step of screening out undersized ballast from the portion of withdrawn old ballast before said comminuting step, and discharging undersized ballast over the exposed subgrade.

10. A method of rehabilitating a ballast bed by installing a protective layer between a subgrade and a layer of ballast, comprising the steps of:

exposing the subgrade by continuously removing old ballast from the ballast bed;

withdrawing and comminuting at least a portion of old ballast;

discharging comminuted old ballast over the exposed subgrade to form at least part of the protective layer, and screening out undersized ballast from the portion of withdrawn old ballast before said comminuting step, and discharging undersized ballast over the exposed subgrade.

11. The method of claim 10, further comprising the steps of planing and compacting the protective layer, and discharging new ballast over the protective layer.

12. The method of claim 10, further comprising the step of cleaning the portion of withdrawn old ballast before said comminuting step.

13. Arrangement for rehabilitating a ballast bed, comprising:

a machine frame defining a longitudinal axis, said machine frame being supported by undercarriages for movement in an operating direction along a track;

a track lifting unit mounted to said machine frame for lifting the track;

excavating means vertically adjustably mounted to said machine frame between the undercarriages for removing old ballast from the ballast bed, said excavating means including a leading excavation unit and a trailing excavation unit spaced from each other longitudinally in direction of the longitudinal axis and operated independently from each other, with said leading excavation unit positioned for withdrawing only an upper layer of old ballast from the ballast bed, and with said trailing excavation unit positioned for removing remaining old ballast from the ballast bed and an adjoining subgrade;

a first conveyor operatively connected to said leading excavation unit; and a second conveyor operatively connected to said trailing excavation unit.

14. The arrangement of claim 13, and further comprising a rock crushing means mounted to said machine frame and having an inlet opening for receiving old ballast for comminution, said first conveyor of said leading excavation unit having a discharge end positioned to cooperate with said inlet opening.

15. The arrangement of claim 14 wherein said machine frame has a leading carrier frame supporting said rock crushing means.

16. The arrangement of claim 14, further comprising a hopper mounted to said machine frame, and a further conveyor arranged for transport of sand to said hopper, said hopper receiving sand from said further conveyor and comminuted old ballast from said rock crushing means.

17. The arrangement of claim 16 wherein said further conveyor means for transport of sand has a receiving end positioned at a rearward end or said machine frame in operating direction.

18. The arrangement of claim 14, further comprising a vibrating screen arranged between the inlet opening of said rock crushing means and the discharge end of said first conveyor means.

19. The arrangement of claim 13 wherein said second conveyor of said trailing excavation unit has a discharge end positioned at a forward end of said machine frame.

20. The arrangement of claim 13 wherein said machine frame includes a leading carrier frame and a trailing carrier frame which is linked to said leading carrier frame, said trailing carrier frame including two frame parts coupled together by a joint which is effective in all directions, each of said frame parts supporting a respective one of said excavation units.

21. The arrangement of claim 13 wherein said leading excavation unit has a discharge end, and further comprising a vibrating screen arranged between a receiving end of said first conveyor and the discharge end of said leading excavation unit.

22. Arrangement for rehabilitating a ballast bed by installing a protective layer between a subgrade and a layer of ballast, comprising:

a machine frame defining a longitudinal axis and being supported by undercarriages for movement in an operating direction along a track;

a track lifting unit mounted to said machine frame for lifting the track;

excavating means vertically adjustably mounted to said machine frame between the undercarriages for removing old ballast from the ballast bed, said excavating means including a leading excavation unit and a trailing excavation unit spaced from each other longitudinally in direction of the longitudinal axis and operated independently from each other, with said leading excavation unit positioned for withdrawing only an upper layer of old ballast from the ballast bed, and with said trailing excavation unit positioned for removing remaining old ballast from the ballast bed and an adjoining subgrade;

rock crushing means mounted to said machine frame and having an inlet opening for receiving old ballast withdrawn by said leading excavation unit for comminution;

a hopper mounted to said machine frame and positioned to receive sand from a conveyor and comminuted old ballast from said rock crushing means;

planing and compacting means for leveling and consolidating the protective layer; and a swing-type conveyor belt swingably mounted to said machine frame about a vertical axis and having a discharge end arranged immediately before said planing and compacting means in operating direction, said hopper being arranged above said swing-type conveyor belt.

* * * * *